United States Patent
Almeras et al.

[11] Patent Number: 5,855,723
[45] Date of Patent: Jan. 5, 1999

[54] PROCESS FOR THE ADHESIVE BONDING OF FERRITE PIECES

[75] Inventors: Jean-Claude Almeras, Valence; Jean-Bernard Dezord, Bourg les Valence, both of France

[73] Assignee: Sextant Avionique, Velizy Villacoublay, France

[21] Appl. No.: 722,176
[22] PCT Filed: Feb. 13, 1996
[86] PCT No.: PCT/FR96/00229
§ 371 Date: Oct. 10, 1996
§ 102(e) Date: Oct. 10, 1996
[87] PCT Pub. No.: WO96/25467
PCT Pub. Date: Aug. 22, 1996

[30] Foreign Application Priority Data
Feb. 15, 1995 [FR] France ................................... 95 01721

[51] Int. Cl.⁶ ................................................. B32B 31/12
[52] U.S. Cl. ........................... 156/281; 428/548; 428/551
[58] Field of Search ................................... 156/73.5, 153, 156/281; 428/548, 551; 264/611; 29/458, 469, DIG. 1

[56] References Cited

U.S. PATENT DOCUMENTS

| | | | |
|---|---|---|---|
| 2,628,178 | 2/1953 | Burnett et al. | 156/332 X |
| 3,408,252 | 10/1968 | Manganello et al. | 156/281 X |
| 3,972,084 | 8/1976 | Reynolds | 118/107 X |
| 4,562,104 | 12/1985 | Maeda | 428/148 |

*Primary Examiner*—Mark A. Osele
*Attorney, Agent, or Firm*—Oblon, Spivak, McClelland, Maier & Neustadt, P.C.

[57] ABSTRACT

In order to adhesively bond two ferrite pieces to one another and obtain an adhesive film with a thickness of less than 100 μm, use is made of an anaerobic adhesive based on a methacrylate monomer. The quality of the adhesive bonding is greatly improved if, according to the invention, a metal deposit, for example of copper, is produced on one of the faces to be adhesively bonded. In the preferred embodiment, the deposit is obtained by rubbing the face to be adhesively bonded onto a copper block.

7 Claims, 1 Drawing Sheet

PROCESS FOR THE ADHESIVE BONDING OF FERRITE PIECES

BACKGROUND OF THE INVENTION

1. Field of the Invention

The invention relates to the field of processes for assembling porous materials by adhesive bonding using adhesives. It is in particular applicable to cores for coils or transformers, for example for electrical power supplies of equipment installed onboard an aircraft or satellite, the cores of which are made of ferrite. As is known, these cores are intended to increase the local magnetic permeability in the vicinity of the windings, typically of coils or transformers.

2. Discussion of the Background

One example of a ferrite former used for such embodiments is represented by way of indication in FIG. 1. This figure represents a perspective half-view.

The ferrite piece 1 represented in FIG. 1 includes, around an axis XX' of revolution, a central core 2 of cylindrical shape and a peripheral ring 3, concentric with the central core. The peripheral ring includes two openings 4, 5, intended to make it possible for the wires constituting a winding (not shown) to be passed through. The central core 2 and the peripheral ring 3 are joined by a base 6. A hollow space 7, between the central core and the peripheral ring, allows the winding to be inserted. When the winding is in place, a second ferrite piece, which is symmetrical with the piece represented in FIG. 1, with respect to a plane perpendicular to XX', is placed against this piece represented. The magnetic circuit of the winding is then complete and closed.

One currently known process for joining the two ferrites, and thus assembling what is referred to as the "pot", is a process by adhesive bonding using an epoxy resin, for example araldite (registered trade mark of CIBA GEIGY).

A bead of adhesive is deposited between the two pieces, at the external periphery of the peripheral ring.

Such a process is generally satisfactory both from the electrical point of view, since the air gap is fairly small, and from the mechanical point of view, since assembly is solid and reliably produced.

Such assembly does, however, have two major drawbacks. On the one hand, it requires the use of a resin and a hardener, which implies prior preparation, and on the other hand it results in the presence of a peripheral assembly bead. This bead constitutes a protuberance which increases the overall diameter of the pot. This increases the size required for the pot insertion, which overall increases the volume and therefore the weight of the circuits into which the pots are then incorporated.

In order to reduce the size of these pots, the Applicant Company has envisaged replacing the external epoxy resin bonding bead by adhesively bonding the faces of the two parts of the pot to be assembled.

It was not possible to use epoxy resins, for example, for this adhesive bonding because the films deposited are too thick and produce air gaps which are too large, in excess of 150 μm, which impairs the electrical properties of the circuit.

SUMMARY OF THE INVENTION

It is found that adhesives of the anaerobic liquid type, for example adhesives of the 600 series produced by the company Loctite, produce films of suitable thickness, typically 50 to 100 μm. These are, however, anaerobic adhesives which are not, a priori, suitable for materials such as sintered materials which also contain oxygen, such as ferrites of general formula $MF_2O_4$, where M is a metal (for example nickel, manganese or magnesium).

The Applicant Company nevertheless carried out tests which were at first satisfactory. However, problems of detachment occurred. A complete review of the process made it possible to determine that this detachment was due neither to poor application or to defective cleaning of the surfaces to be adhesively bonded.

After other tests, the Applicant Company designed the process according to the invention. It is a simple process, making it possible to assemble materials which are porous and/or contain oxygen. It is a process in which the assembly film is between 50 and 100 μm thick, which makes it possible to retain good core qualities in the case of ferrite pots. Finally, it is a process which requires only a single product and which, according to the tests, provides an assembly with a better tensile strength than the known process, in particular after accelerated ageing cycles by rapid temperature variation.

To all these ends, the invention relates to a process for the adhesive bonding of a first piece made of sintered material to a second piece, each of the two pieces having an assembly surface, the process being characterized in that the adhesive bonding is carried out by means of an anaerobic adhesive based on methacrylate and includes the following steps:

a metal deposit is produced on at least one of the assembly surfaces, the anaerobic adhesive is deposited on at least one of the assembly surfaces, the pieces are assembled and the adhesive is allowed to polymerize.

BRIEF DESCRIPTION OF THE DRAWINGS

An illustrative application of the process will be described below for a piece as represented in FIG. 1. This figure represents a perspective sectional view of a piece to be assembled with another similar piece.

Results of tests will then be given with reference to FIG. 2, which represents a sectional view, on an axial plane, of two pieces according to FIG. 1 when assembled according to the prior art.

Figure 1:
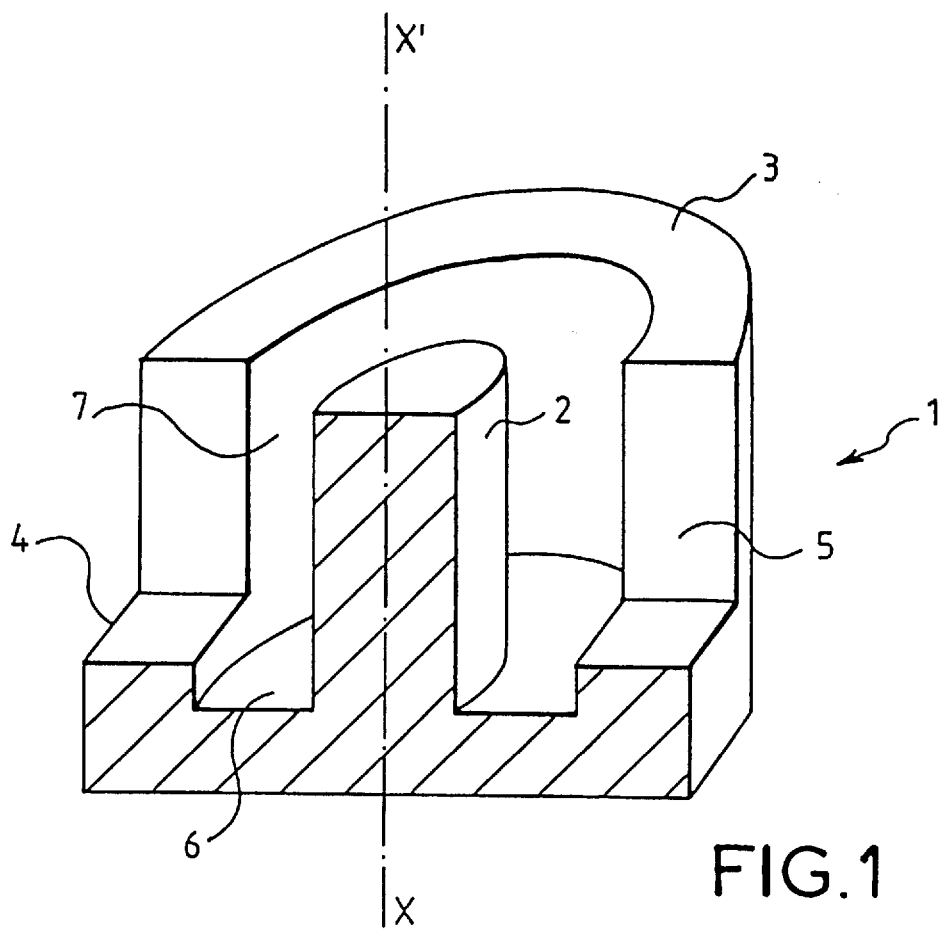

An illustrative application of the process will be given below with reference to FIG. 1, which has already been described. It will be recalled that the piece is a sintered ferrite piece.

DETAILED DESCRIPTION OF THE PREFERRED EMBODIMENTS

The adhesive bonding carried out related to two similar pieces which were to be assembled on a join plane perpendicular to the axis of revolution of the pieces. In this case, the assembly surface therefore consists of a circular ring 3 concentric with a central circular block 2.

After the usual surface preparation, the assembly faces were rubbed manually on a copper plate for approximately two seconds. This simple rubbing was sufficient to create a deposit of negligible thickness on the surfaces.

The adhesive bonding procedure is then carried out according to the method which is conventional for this type of adhesive. The adhesive employed was the methacrylate-based anaerobic adhesive with the reference 675 sold by the company Loctite.

The thickness of the join thus produced was 50 to 100 μm depending on the samples.

Next, tests intended for validating the adhesive bonding were carried out. A check was first made that the copper deposit produced did not have a detrimental effect on the electrical characteristics of the equipment produced with ferrites thus assembled. Mechanical tensile tests were then carried out in order to compare the process according to the invention, on the one hand with the known process and, on the other hand, with the same process but without the copper deposition phase. The results obtained on batches with of the order of ten pieces are as follows.

Two batches were made using the Loctite 675 adhesive without prior rubbing on copper.

For the first batch, only the outer circular ring was coated with adhesive, and for the second batch, both the outer ring 3 and the central core 2 were coated.

For the first batch, forces to break the adhesive bond varying from 20 to 100 newtons were observed. For the second batch, these forces were 72 to 167 newtons. The difference between the two was attributed to the difference in the surface areas to which adhesive was applied.

However, some pieces in the two batches were not included in the tests because they had been detached without a force being applied, simply by being handled. It is assumed that these adhesive bonding defects are due to differences in the batches of ferrites supplied. Microscopic analysis of the surface conditions revealed atomic compositions and granulation which differed according to the batches.

Tests were then carried out on batches adhesively bonded by the outer rings only, after having had a copper deposit applied beforehand by gentle rubbing. The breaking forces reached fluctuated between 111 newtons, for the weakest, and more than 180 newtons for the strongest. (The tensile testing machine used was limited to 180 newtons).

Since these first tests were encouraging, tests were carried out on adhesively bonded pieces which had been subjected to accelerated ageing by means of rapid temperature variation cycles. For a first batch which had been subjected to 21 cycles, a mean breaking force of 142 newtons was observed, the standard deviation being 19 newtons. For a second batch which had been subjected to 57 cycles, the mean was 126 newtons and the standard deviation was 14 newtons.

In order to relate the performance thus obtained to the known process, tensile tests were also carried out on pieces obtained with the known process.

Figure 2:
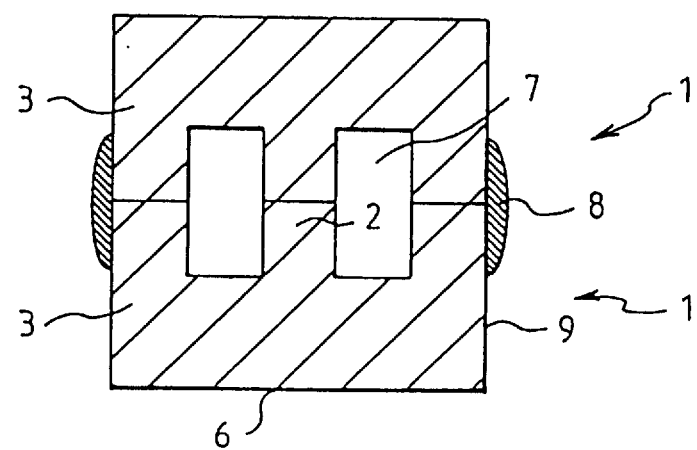

It will be recalled that this process consists of peripheral adhesive bonding obtained using a two-component outer peripheral bead 8 (represented in FIG. 2).

For clarity, a piece produced using this process has been represented in section on an axial plane. The central block 2 and the peripheral ring 3 can be seen on this piece. Assembly is carried out by depositing an adhesive bead 8 on the outer lateral surface 9 of each piece 1, approximately symmetrically with respect to the join plane. The bead 8 has a thickness of approximately 1 mm and a length of approximately 3 mm. As explained above, this bead substantially increases the overall size of the assembly. The results of the test carried out, on one batch without prior ageing, gave a breaking mean of 127 newtons with a standard deviation of 12 newtons. It can therefore be seen that the quality of the adhesive bonding is substantially inferior to the adhesive bonding quality obtained with the process according to the invention. (Mean: 142 newtons, standard deviation: 19).

At this stage, the inventor does not know the phenomenon or phenomena underlying the observed improvement.

Factors which he is considering are: a favourable effect on the polymerization of the methacrylates, improved wettability of the layer created by the deposit, or an effect of plugging the pores in the ferrite. It is therefore probable that metals other than copper may be equally suitable. The inventor is considering bronze, brass, beryllium, cobalt, iron, steel, nickel or manganese, this list being given without implying any limitation.

If the plugging effect were to be important, it would be preferable to prepare the assembly surfaces of each of the pieces involved in the assembly. In the opposite case, depositing metal on only one of the two surfaces would suffice. For the Applicant Company, the problem has not arisen, because it is envisaged to prepare all the pieces involved in assembly by vibrating them on a copper plate, in order not to have to pair the pieces, with one piece having received the deposit and the other piece not having received it. Naturally, the metal block on which the ferrite piece is rubbed should preferably have a surface, for example recessed, which is complementary with the assembly surface of the piece to be assembled with it, if the latter is in relief.

The inventors consider the process to be applicable not only to ferrites, as shown by the tests carried out, but also to all metal oxides, in particular sintered ones, for which adhesive bonding with anaerobic adhesives has not to date been considered. The Applicant Company envisages, in particular, optionally sintered aluminas ($Al_2O_3$) and, more generally, ceramics, in particular sintered ceramics.

We claim:

1. Process for the adhesive bonding of a first piece made of sintered material to a second piece made of sintered material, each of the two pieces having an assembly surface, the process being characterized in that the adhesive bonding is carried out by means of an anaerobic adhesive based on methacrylate and includes the following steps:

a copper deposit is produced on at least one of the assembly surfaces by rubbing copper metal thereon, the anaerobic adhesive is deposited on at least one of the assembly surfaces, the pieces are assembled and the adhesive allowed to polymerize.

2. Process according to claim 1, in which the copper is deposited by rubbing one assembly surface on a piece having a surface made of copper.

3. The process of claim 1, wherein the copper is deposited by vibrating a piece made of sintered material on a copper plate.

4. Process for the adhesive bonding of a first piece made of a sintered material based on a metal oxide to a second piece made of a sintered material based on a metal oxide, each of the two pieces having an assembly surface, the process being characterized in that the adhesive bonding is carried out by means of an anaerobic adhesive based on methacrylate and includes the following steps:

a copper deposit is produced on at least one of the assembly surfaces by rubbing copper metal thereon, the anaerobic adhesive is deposited on at least one of the assembly surfaces, the pieces are assembled and the adhesive allowed to polymerize.

5. Process according to claim 4, in which the copper is deposited by rubbing one assembly surface on a piece having a surface made of copper.

6. The process of claim 4, wherein the copper is deposited by vibrating a piece made of sintered material on a copper plate.

7. The process of claim 5, wherein the sintered material is a ferrite of formula $MF_2O_4$, where M is a metal selected from the group consisting of nickel, manganese and magnesium.

* * * * *